(12) United States Patent
Fasen (10) Patent No.: US 6,657,444 B2
(45) Date of Patent: Dec. 2, 2003

(54) CAPACITANCE-BASED POSITION SENSOR WITH INTEGRATING DEMODULATOR

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/043,994

(22) Filed: Jan. 11, 2002

(65) Prior Publication Data

US 2003/0132764 A1 Jul. 17, 2003

(51) Int. Cl.[7] .......................... G01R 27/26; G01R 27/08
(52) U.S. Cl. .................... 324/676; 324/661; 324/681
(58) Field of Search ............................ 324/658, 660, 324/661, 662, 667, 668, 674, 676, 681, 683; 361/277, 280; 340/209

(56) References Cited

U.S. PATENT DOCUMENTS

| | | | |
|---|---|---|---|
| 4,928,093 A | 5/1990 | Rahman | 345/157 |
| 5,428,355 A | 6/1995 | Jondrow et al. | 341/20 |
| 5,557,596 A | 9/1996 | Gibson et al. | 369/101 |

*Primary Examiner*—N. Le
*Assistant Examiner*—Vincent Q. Nguyen (57) ABSTRACT

A capacitance-based position sensor configured to sense relative position of a pair of objects. The sensor includes capacitor circuitry having a capacitor that varies in capacitance with relative position of the pair of objects. A source is coupled to the capacitor circuitry, and is configured to apply a time-varying input to the capacitor circuitry. The capacitor circuitry is configured to yield a time-varying, capacitance-dependent output in response to application of the time-varying input from the source. The sensor further includes an integrator configured to integrate, for a predetermined time period, a received signal that is based upon the time-varying, capacitance-dependent output from the capacitor circuitry. The integration yields an integrator output which is proportional to the value of the capacitance. This output is usable to determine relative position of the objects.

26 Claims, 5 Drawing Sheets

FIG. 1

SECTION A-A

FIG. 8

CAPACITANCE-BASED POSITION SENSOR WITH INTEGRATING DEMODULATOR

TECHNICAL FIELD

The invention relates to capacitance-based position sensors, and more particularly to capacitance-based position sensors where relative displacements occurring between objects are determined in part by applying time-varying input signals to a capacitor having a value that varies with relative displacement of the objects.

BACKGROUND OF THE INVENTION

Capacitance-based position sensors are widely known. Many such sensors employ a variable capacitor having a value that varies with relative position of a pair of objects. In these systems, the relative position of the objects can be determined by measuring the capacitance.

A basic design issue arises in these systems from the fact that a capacitor acts as an open circuit when non-time-varying signals, such as DC voltages, are applied to the capacitor. Therefore, to produce a measurable response, that is, a response from which capacitance can be determined, a time-varying signal is often applied as an input. Frequently, this input signal is a high frequency sinusoidal carrier.

Application of such a time-varying input yields a corresponding time-varying output from the position-dependent capacitance. In addition to varying as a function of time, the output varies with the value of the capacitance. Due to the time-varying, and often high frequency, nature of the output, additional processing is normally necessary to extract the desired information (e.g., the value of the capacitance).

The structures and/or methods used in existing systems to extract this information, though sometimes adequate, are not suitable for a large number of applications in which capacitance-based position sensing can be used. For example, capacitance-based position sensing is often used in very small, precise applications, such as in micro electro-mechanical systems (MEMS), and/or in applications involving a number of different relative movements. In these situations, and in a variety of other applications, simplicity of design is an important consideration. In many existing systems, however, a relatively large amount of circuitry is needed to extract the desired information from the time-varying output of the variable capacitor. This circuitry is often fairly precise and complex. In addition, it can consume a large amount of physical space and generate excessive heat.

SUMMARY OF THE INVENTION

The present invention provides a capacitance-based position sensor, which may be used to sense relative position of a pair of objects. The sensor includes capacitor circuitry having a capacitor that varies in capacitance with relative position of the pair of objects. The sensor also includes a source configured to apply a time-varying input to the capacitor circuitry. The capacitor circuitry is configured to yield a time-varying, capacitance-dependent output in response to application of the time-varying input. The sensor further includes an integrator configured to integrate, for a predetermined time period, a received signal that is based upon the time-varying, capacitance-dependent output from the capacitor circuitry. The integration yields an integrator output which is proportional to the value of the capacitance. This output is usable to determine relative position of the objects. In some embodiments, the sensor is used to sense relative position of a computer storage medium and an access device that is configured to selectively access storage locations provided on the storage medium.

DETAILED DESCRIPTION OF THE INVENTION

The present invention is directed to a capacitance-based position sensor. The sensor embodiments described herein may be used in a variety of settings, but have proven particularly advantageous when used in very small computer storage devices and other MEMS systems. For purposes of illustration only, the sensors described below will be discussed primarily in the context of a high-density MEMS computer storage device.

Figure 1:
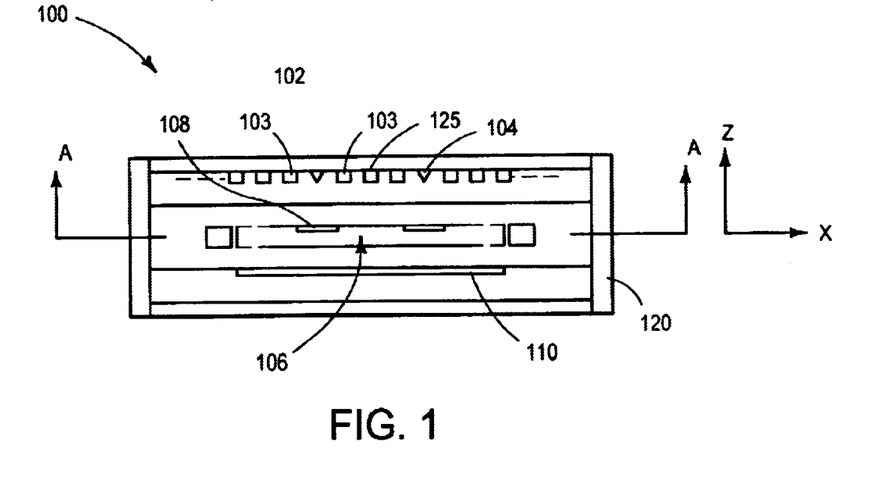
FIGS. 1–3 show different perspectives of a computer storage device with which a capacitance-based position sensor according to the present invention may be used.
Figure 2:
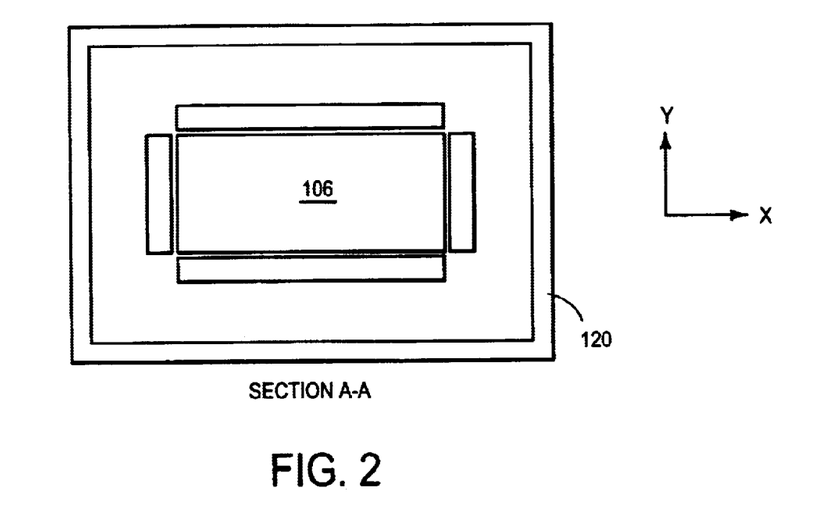

FIGS. 1 and 2 respectively show side and top cross-section views of a storage device 100, with which a capacitance-based position sensor according to the invention may be used. Storage device 100 includes a number of field emitters, such as 102 and 104, a storage medium 106 with a number of storage areas, such as 108, and a microactuator 110, which scans (moves) the storage medium 106 with respect to the field emitters or vice versa. Storage device 100 may be configured so that each storage area is responsible for storing one bit or many bits of information.

The field emitters may be configured as point-emitters having very sharp points. For example, each field emitter may have a radius of curvature of about one nanometer to hundreds of nanometers. During operation, a preselected potential difference is applied between a field emitter and its corresponding gate, such as between emitter 102 and circular gate 103 surrounding emitter 102. Due to the sharp point of the emitter, an electron beam current is extracted from the emitter and directed with a high degree of precision towards the storage area. Depending on the distance between the emitters and storage medium 106, the type of emitters, and the spot size (bit size) required, electron optics may be desired to focus the electron beams. A voltage may also be applied to storage medium 106 to either accelerate or decelerate the field-emitted electrons or to aid in focusing the field-emitted electrons. Because the field emitters are used to access desired storage areas on the storage medium, the field emitters will also be referred to herein as access devices.

Casing 120 typically is adapted to maintain storage medium 106 in partial vacuum, such as at least $10^{-5}$ torr. Researchers have produced microfabricated field emitters in vacuum cavities using semiconductor processing techniques. See, for example, "Silicon Field Emission Transistors and Diodes," by Jones, published in IEEE Transactions on Components, Hybrids and Manufacturing Technology, 15, page 1051, 1992.

Each field emitter may correspond to one or more storage areas provided on storage medium 106. Where each field emitter is responsible for a number of storage areas, storage device 100 typically is adapted to scan or otherwise effect relative movement between casing 120 (and thus, the field emitters) and storage medium 106. For example, microactuator 110 typically is adapted to scan medium 106 to different locations, so that each field emitter is positioned above different storage areas. With such a configuration, microactuator 110 can be used to scan an array (typically two-dimensional) of field emitters over the storage medium. Because storage medium 106 moves relative to casing 120, it will at times be referred to as the "mover." Correspondingly, casing 120 and various other components that are fixed relative to the casing (e.g., the field emitters) will be at times referred to as the "stator."

The field emitters typically are configured to read and/or write information on the storage areas via electron beams they produce. Thus, field emitters suitable for use with storage device 100 must produce electron beams narrow enough to achieve the desired bit density on storage medium 106. Further, the field emitters must provide electron beams of sufficient power density to perform the desired read/write operations. A variety of methods may be used to fabricate such field emitters. For example, one method is disclosed in "Physical Properties of Thin-Film Field Emission Cathodes With Molybdenum Cones," by Spindt et al, published in the Journal of Applied Physics, Vol. 47, No. 12, December 1976. Another method is disclosed in "Fabrication and Characteristics of Si Field Emitter Arrays," by Betsui, published in Tech. Digest 4th Int. Vacuum Microelectronics Conf., Nagahama, Japan, page 26, 1991. Such emitters have been successfully employed in various applications, such as in flat panel displays.

The field emitters may be provided as a two-dimensional array (e.g., 100 by 100 emitters), with an emitter pitch of 50 micrometers in both the x- and the y-directions. Each emitter may access bits in tens of thousands to hundreds of millions of storage areas. For example, the emitters may scan over (i.e., move relative to) a storage medium that has a two dimensional array of storage areas, where the periodicity between adjacent storage areas is anywhere from a fraction of a nanometer to 100 or more nanometers, and where the operational range of the microactuator is 50 micrometers in both the x- and y-directions. Also, the field emitters may be addressed simultaneously or in a multiplexed manner. Parallel addressing schemes may provide storage device 100 with significant performance enhancements in terms of access time and data rate.

Figure 3:
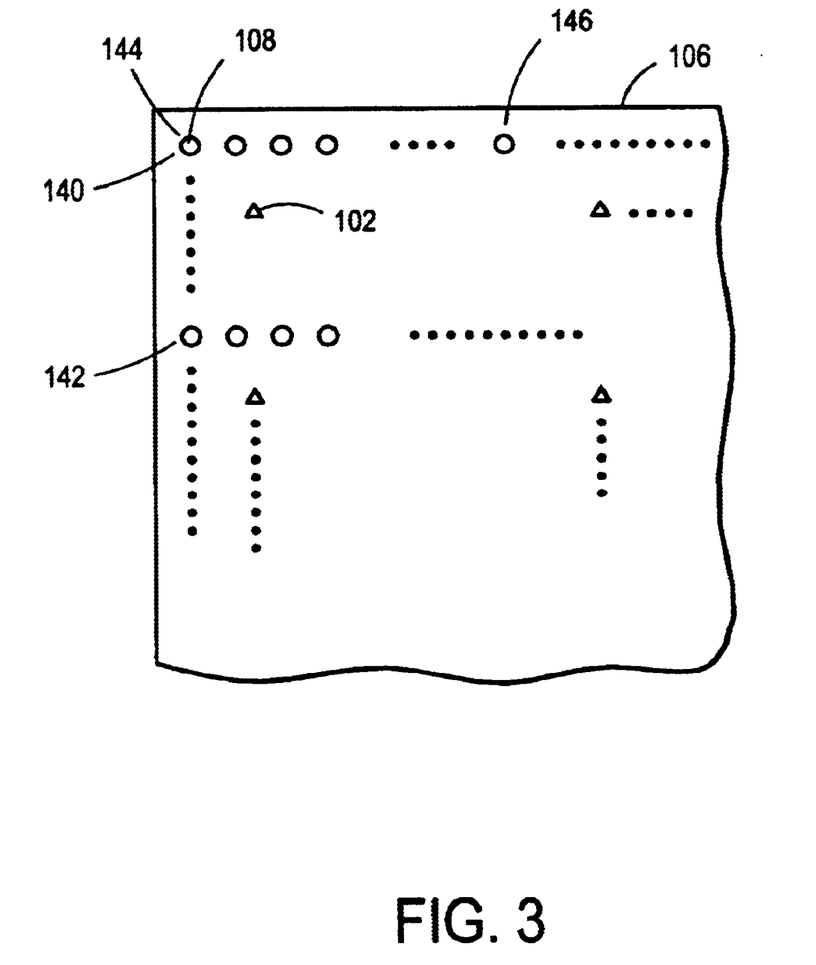

FIG. 3 is a top view of an exemplary storage medium 106, depicting a two dimensional array of storage areas and a two dimensional array of field emitters. External circuitry (not shown) is used to address the storage areas. As indicated, it will often be desirable to segment the storage medium into rows, such as row 140, where each row contains a number of storage areas, such as storage area 108. Typically, each emitter is responsible for a number of rows, but is not responsible for the entire length of those rows. For example, as depicted, emitter 102 is responsible for the storage areas within rows 140 through 142, and within columns 144 through 146.

The foregoing describes an exemplary storage device with which a capacitance-based position sensor according to the present invention may be used. Other aspects of this type of storage device are disclosed in U.S. Pat. No. 5,557,596, the disclosure of which is incorporated herein by this reference.

Figure 4:
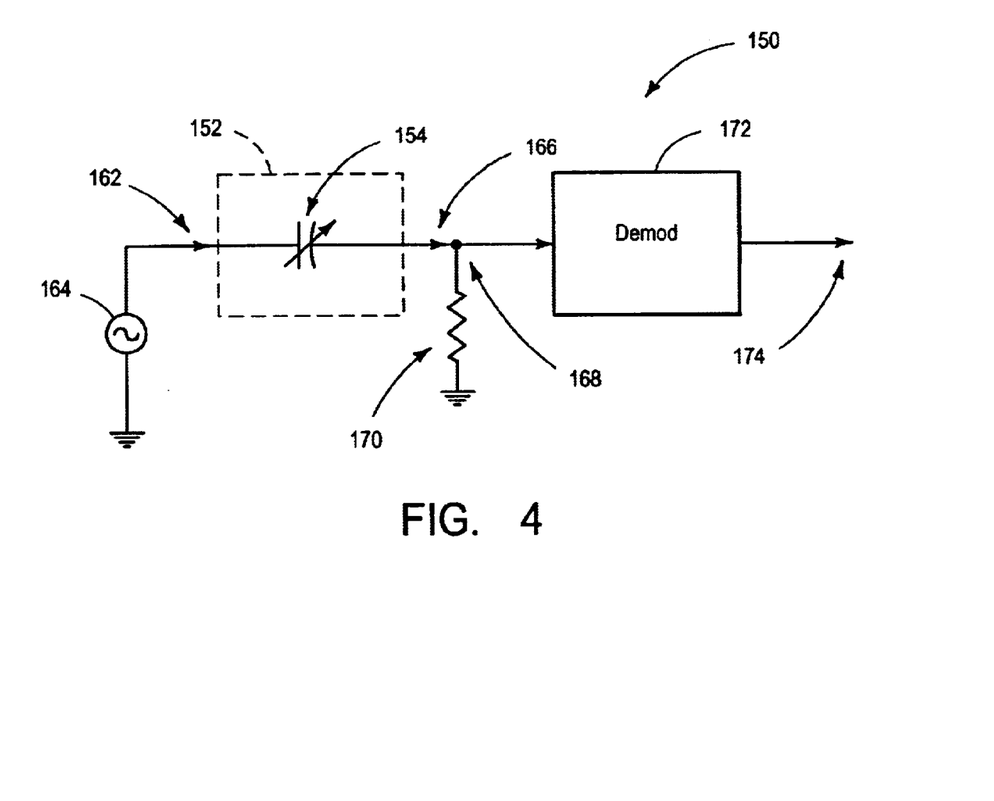
FIG. 4 is a schematic depiction of an embodiment of a capacitance-based position sensor according to the invention.
Figure 5:
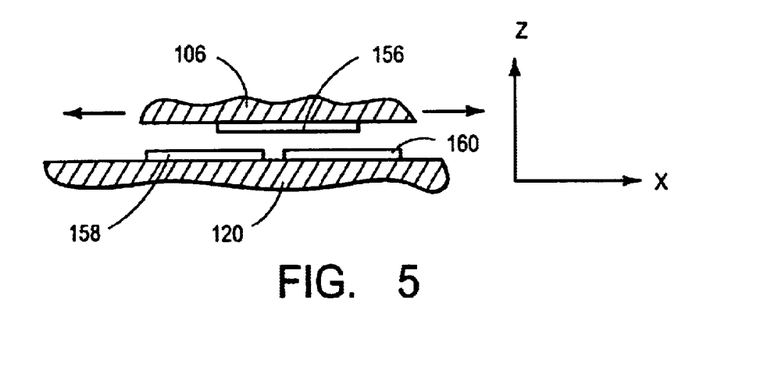
FIG. 5 depicts a pair of movable objects with which a capacitance-based position sensor according to the present invention may be used.

FIG. 4 shows a schematic of a capacitance-based position sensor 150 according to the present invention. Sensor 150 includes capacitor circuitry 152, including a capacitor 154 having a capacitance that varies with relative position of a pair of objects. As shown in FIG. 5, this type of position-dependent capacitance may be implemented by securing conductive material, such as plate members 156, 158 and 160, to various portions of the above-described storage medium 106 and casing 120. When storage medium 106 moves along the depicted x-axis relative to casing 120, the overlap occurring between the plate members varies. Since the capacitance between a pair of spaced plates varies with the amount of overlapping area, the x-axis displacement in turn produces a corresponding change in capacitance.

The plate arrangement of FIG. 5 is intended to be illustrative only. A wide variety of other configurations may be used to produce a position-dependent capacitor, such as capacitor 154. Other exemplary configurations are discussed in a U.S. Patent Application entitled "Capacitance-Based Position Sensor" by Donald J. Fasen and Storrs T. Hoen, filed Jan. 11, 2002, the disclosure of which is incorporated herein by this reference.

Since capacitors act as an open circuit at DC, typically a time-varying or other non-constant input 162 is applied to variable capacitor 154 from source 164, which typically is coupled in series with capacitor circuitry 152. This is done in order to produce a measurable, capacitance-dependent response. Typically, the input signal is a high frequency sinusoidal signal. In any event, application of the input produces a time-varying, capacitance-dependent output 166 at circuit node 168, which typically is taken across a resistance 170. It will be appreciated that capacitor circuitry 152 and resistance 170 form a high-pass filter for signals applied from source 164.

Sensor 150 further includes demodulator circuitry 172, which is coupled to capacitor circuitry 152 and configured to process time-varying output 166 produced by the capacitor circuitry. This time-varying output is processed in order to provide a final output 174 which is proportional to the value of capacitor 154. Typically, demodulator is configured to provide a constant, as opposed to time-varying, final output which is indicative of the value of the position-dependent capacitor. Since it is proportional to the value of capacitor 154, the final output is easily usable to determine relative displacement of the objects with which sensor 150 is associated (e.g., storage medium 106 and casing 120).

Using storage medium 106 and casing 120 as an example, the operation of the position sensor may be summarized as follows: time-varying input 162 is applied to capacitor 154 of capacitor circuitry 152. Output 166 of capacitor circuitry 152 is time-varying as well, and further depends on the value of the capacitor. Since the value of the capacitor varies with relative position of storage medium 106 and casing 120, it will be seen that output 166 is a time-varying signal that depends on the relative position of the storage medium and casing. Demodulator circuitry 172 receives and processes this output to produce a final output 174 that is constant and that varies proportionally with relative position of the storage medium and casing.

As indicated above, input 162 to capacitor circuitry 152 typically is a high-frequency sinusoid. For many implementations of capacitor circuitry 152, this results in a sinusoidal output at node 168, with an amplitude that varies with the value of capacitor, and thus with relative position of the objects. Accordingly, demodulator circuitry 172 is often configured to perform frequency selection and peak sensing on the signal received from capacitor circuitry 152. One way of accomplishing this is through use of narrow band filters tuned to the frequency of the input signal applied from source 164 (i.e., signal 162). Additional processing steps may include envelope detection, peak detection and/or other techniques for determining the amplitude of the signal received from capacitor circuitry 152.

Figure 6:
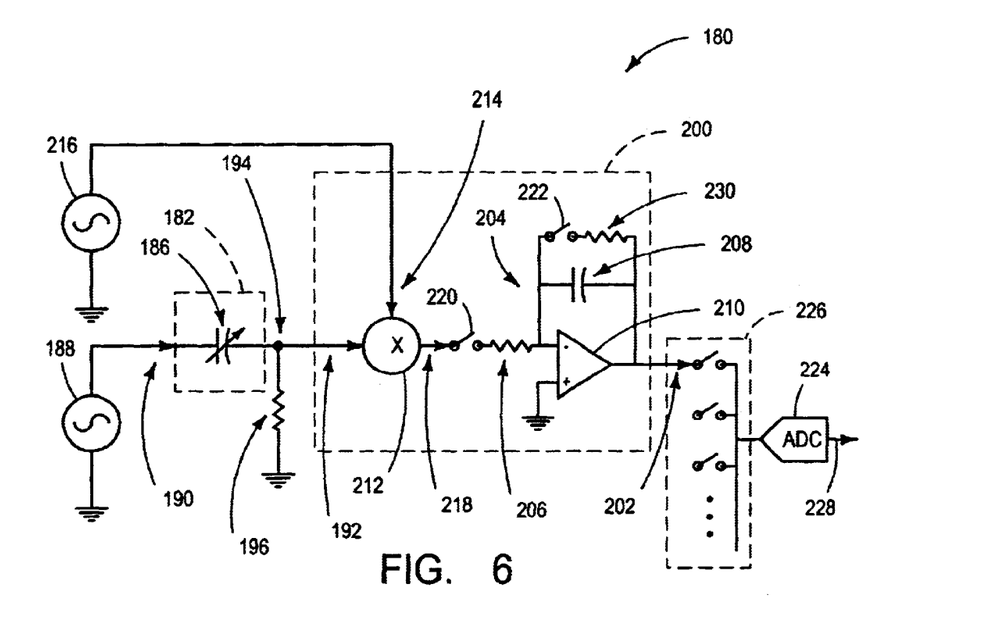
FIG. 6 is a schematic depiction of another embodiment of a capacitance-based position sensor according to the invention.

FIG. 6 depicts another embodiment of a position sensor 180 according to the present invention. As before, sensor 180 includes capacitor circuitry 182 with position-dependent capacitor 186. Source 188 is configured to apply a time-varying input 190 to capacitor 186, in order to produce a measurable output 192, which typically is produced at node 194 via use of a voltage-sampling resistance 196. Similar to the embodiment described above, output 192 is a time-varying signal, which depends also on the value of capacitor 186 (and thus upon the relative position of the objects with which position sensor 180 is used). Output 192 is provided to demodulator circuitry 200, which, similar to the previously described embodiment, performs various processing functions to yield an output 202 proportional to the relative position of the objects. Unlike output 192 from capacitor circuitry 182, output 202 from demodulator circuitry 200 typically is a low frequency, demodulated position signal which changes proportionally to changes in the relative position of the capacitor plates.

Referring still to FIG. 6, demodulator circuitry 200 will be described in more detail. As indicated, demodulator circuitry 200 includes an integrator 204, which typically is implemented with a resistor 206, capacitor 208 and op-amp 210 in an inverting configuration. Integrator 204 is configured to receive output from capacitor circuitry 182, either directly or after intervening processing, and integrate the received signal, normally for a set duration (e.g., a predetermined number of cycles of sinusoidal input signal 190). This produces a signal level which is proportionate to the value of capacitor 186. The integrated output can be sampled and stored, or further processed. Sampling yields a final output that is the relative position signal.

A multiplier 212 may be provided to perform additional processing, as indicated in the depicted embodiment. Multiplier 212 receives output 192 from capacitor circuitry 182, and multiplies this with an additional input signal 214 from source 216. As will be further explained with reference to FIG. 8, it will often be desirable that this input (i.e., input signal 214) be of the same frequency as the input applied to capacitor circuitry 182 (i.e., input 190). As indicated, multiplier 212 is typically configured within demodulator circuitry 200 "upstream" of integrator 204, such that a product output signal 218 is output by the multiplier and provided to the integrator.

A given movable system may include many moving parts and/or involve motion in more than one direction. Accordingly, certain of the components of the position sensors described herein may be replicated to provide position sensing capability for such an expanded system. For example, in one embodiment of the storage device described with reference to FIGS. 1–3, storage medium 106 is but one of 16 such storage mediums, each of which are independently movable relative to casing 120 within the x-y plane. The position sensor for this device must provide functionality for 32 different directions: 2 axes per storage medium, for each of the 16 storage mediums.

To accommodate this type of expanded system, demodulator circuitry 200 may be configured to receive and process output received from multiple position-dependent capacitors. Continuing with the above example, this may be achieved as indicated in FIG. 6 by providing an integrator for each of the 32 different axes. In embodiments employing a multiplier 212, a separate multiplier may also be provided for each axis.

Figure 7:
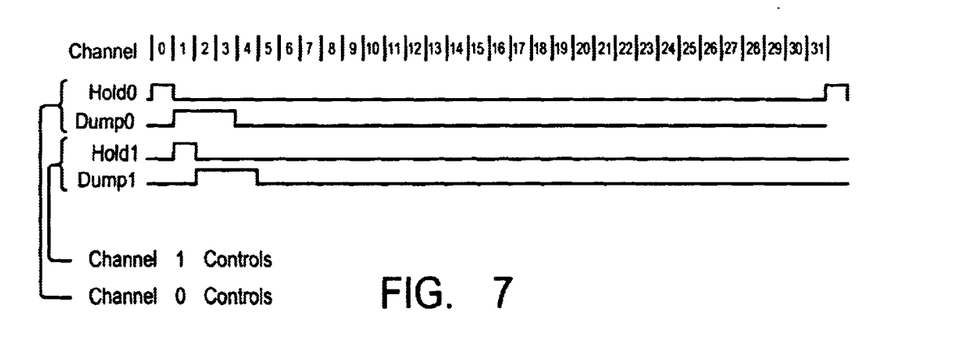
FIG. 7 is a timing diagram depicting signals that may be used to control the position sensor of FIG. 6.

FIG. 7 is a timing diagram depicting an illustrative timing that may be used for the various control/switching signals that are applied to operate the sensor in an expanded system, such as the 32-axis system described above. As seen in FIG. 6, each integrator 204 includes a hold switch 220 and a dump switch 222. To perform integration, the hold switch is closed for a set duration, while the dump switch is held open. At the end of the integration, the output of op-amp 210 for the given channel is applied to A-D converter 224 through selective operation of a 32-channel switch 226. A-D converter 224 then converts the analog value to a digital, constant output 228 which is proportional to the relative position of the objects along the given axis. Once the output of the op-amp is sampled by A-D converter 224, hold switch 220 is opened and dump switch 222 is closed. Closing the dump switch resets the integrator by allowing the accumulated signal on integrator 204 to discharge through resistor 230.

The timing diagram of FIG. 7 shows application of the hold and dump switches for 32 different channels, which are numbered from 0 to 31. As indicated, the first integrator (channel 0) is held for a set period to produce a proportional signal for the corresponding movement axis. After this value is sampled by A-D converter 224, the second integrator (channel 1) begins integrating for the next movement axis, while channel 0 is reset through closing of the dump switch for channel 0. The system continues in this manner and cycles through all 32 channels, repeatedly performing the integrate-sample-reset process in sequence for each of the integrators. Thus, A-D converter produces a periodically updated, sampled output for each movement axis of the system.

In multiple axis systems, use of integrators such as those described with reference to FIG. 6 can be particularly advantageous. One advantage of the described integration technique is that it often eliminates the need for the narrow band filters and other circuitry needed to perform frequency selection and amplitude detection. The narrow band filters and supporting components can occupy a relatively large amount of space, produce considerable heat, and increase the complexity of the system. These concerns may be particularly significant in systems that move in many directions or have several moving parts, and in very small systems, such as the MEMS storage device described above. For these reasons, use of integrators as described will often be preferable to narrow band filters, particularly in systems with multiple motion axes.

Figure 8:
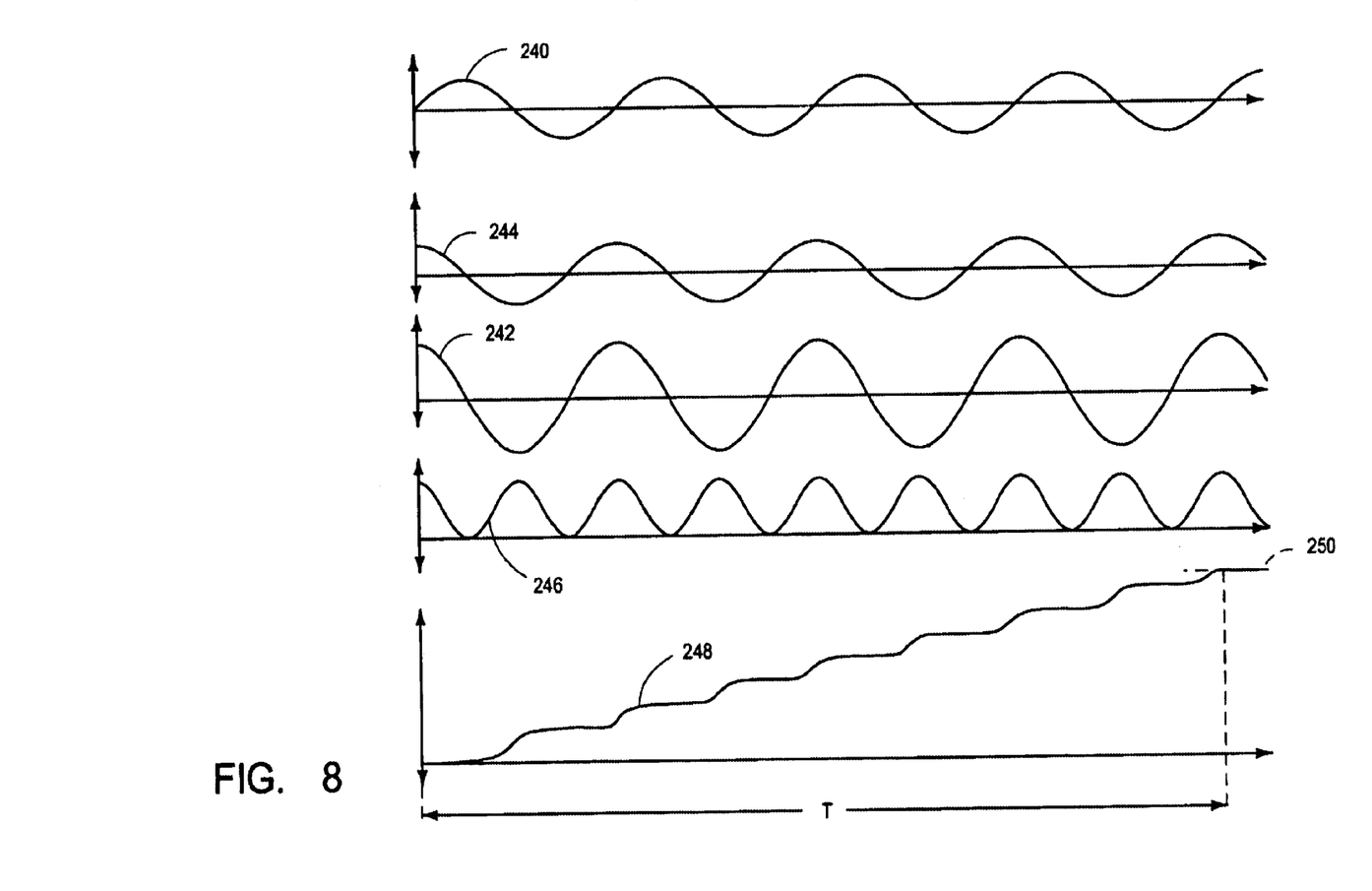
FIG. 8 depicts waveforms of exemplary signals associated with the position sensor of FIG. 6.

FIG. 8 shows waveform depictions of exemplary signals that may exist at various points within the position sensor depicted in FIG. 6. The top-most wave is a sinusoidal input signal 240 which may be applied to capacitor circuitry 182. Application of this input signal to capacitor circuitry 182 results in output 242 on the other side of the capacitor (i.e., taken at node 194). Those skilled in the art will readily appreciate that application of a sinusoidal voltage to a capacitor results in a sinusoidal output of the same frequency, but shifted in phase by ninety degrees from the input signal, as indicated in the figure. A second sinusoidal input signal 244 is shown in the figure. This is an example of a signal that may be produced by source 216 and applied to multiplier 212. This second input typically is of the same frequency as the first input (i.e., signal 240, which may be applied to capacitor circuitry 182), but is shifted in phase from the first input by ninety degrees. A phase shift of zero or any other amount may be employed, as desired to facilitate integration.

The phase difference between the two input signals results in multiplication by multiplier 212 of two signals that are in phase (i.e., signals 244 and 242). The result of the multiplication is product signal 246, as seen in FIG. 8. Waveform 248 shows the progressive integration of product signal 246 for a predetermined length of time T. At the end of the set period, the integration ceases via operation of the switching controls described with reference to FIGS. 6 and 7. It will be seen that, at this point, integrated signal 248 has reached a sampled analog value 250, which is proportional to the value of the respective position-dependent variable capacitor, and thus to the relative displacement along the corresponding motion axis. In the embodiment depicted in FIG. 6, sampled value 250 would be converted from analog to digital by A-D converter 224. In the depicted example, the predetermined duration of the integrations (i.e., T) is four cycles of input signal 240, however other suitable durations may be used. For example, shorter or longer durations may be used to adjust noise rejection or the rate at which position data for each movement axis is updated.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A capacitance-based position sensor, comprising:
capacitor circuitry, including a capacitor having a capacitance that varies with relative position of a pair of objects;
a source configured to apply a first time-varying input to the capacitor, the capacitor circuitry being configured to yield a time-varying, capacitance-dependent output in response to such application of the time-varying input;
a multiplier configured to multiply output received from the capacitor circuitry with a second time-varying input, to produce a product signal; and
an integrator configured to integrate the product signal for a predetermined time period, and thereupon yield an integrator output which is proportional to the value of the capacitance.

2. The capacitance-based position sensor of claim 1, where the first time-varying input is periodic, and where the predetermined time period is a predetermined number of periods of the first time-varying input.

3. The capacitance-based position sensor of claim 1, where the first time-varying input includes a sinusoidal signal.

4. The capacitance-based position sensor of claim 3, where the second time-varying input includes a sinusoidal signal which is equal in frequency but shifted in phase from the sinusoidal signal of the first time-varying input.

5. The capacitance-based position sensor of claim 4, where the sinusoidal signals differ in phase by ninety degrees.

6. The capacitance-based position sensor of claim 1, where the capacitance-based position sensor is configured to sample the integrator output to yield a non-time-varying final output.

7. A capacitance-based position sensor, comprising:
capacitor circuitry, including a capacitor having a capacitance that varies with relative position of a pair of objects;
a source configured to apply a time-varying input to the capacitor, the capacitor circuitry being configured to yield a time-varying, capacitance-dependent output in response to such application of the time-varying input; and
an integrator configured to integrate, for a predetermined time period, a received signal which is based upon the time-varying, capacitance-dependent output, and thereupon yield an integrator output which is proportional to the value of the capacitance.

8. The capacitance-based position sensor of claim 7, where the time-varying input is periodic, and where the predetermined time period is a predetermined multiple of the period of the time-varying input.

9. The capacitance-based position sensor of claim 8, further comprising a multiplier, where the time-varying input is a first time-varying input, and where the received signal is generated by using the multiplier to multiply the first time-varying input with a second time-varying input.

10. The capacitance-based position sensor of claim 9, where the first time-varying input includes a sinusoidal signal.

11. The capacitance-based position sensor of claim 10, where the second time-varying input includes a sinusoidal signal which is equal in frequency but shifted in phase from the sinusoidal signal of the first time-varying input.

12. The capacitance-based position sensor of claim 11, where the sinusoidal signals differ in phase by ninety degrees.

13. The capacitance-based position sensor of claim 7, where the capacitance-based position sensor is configured to sample the integrator output to yield a demodulated position signal.

14. The capacitance-based position sensor of claim 7, where the integrator is one of a plurality of integrators, each integrator being configured to produce output corresponding to one of a plurality of different relative movements.

15. The capacitance-based position sensor of claim 14, further comprising an analog-to-digital converter configured to repeatedly sample output from each of the integrators to provide, from each integrator, a periodically updated final output.

16. The capacitance-based position sensor of claim 7, where the capacitor circuitry is configured in series with the source, and where the time-varying, capacitance-dependent output is taken across a resistance, such that the capacitor circuitry and resistance form a high-pass filter for signals applied by the source.

17. A movable system that employs capacitance-based position sensing, comprising:
   a pair of objects configured to move relative to one another; and
   a capacitance-based position sensor, including:
      capacitor circuitry, including a capacitor having a capacitance that varies with relative position of the pair of objects;
      a source configured to apply a time-varying input to the capacitor, the capacitor circuitry being configured to yield a time-varying, capacitance-dependent output in response to such application of the time-varying input; and
      an integrator configured to integrate, for a predetermined time period, a received signal which is based upon the time-varying, capacitance-dependent output, and thereupon yield an integrator output which is proportional to the value of the capacitance.

18. The movable system of claim 17, where one of the pair of objects is a computer storage medium, and where the other of the pair of objects includes a structure to which an access device is secured, the computer storage medium and access device thus being movable relative to each other to permit storage locations provided on the storage medium to be selectively accessible using the access device.

19. A computer storage device, comprising
   a computer storage medium;
   an access device operatively coupled to the storage medium such that the storage medium and access device are movable relative to one another to permit the access device to selectively access storage locations provided on the storage medium; and
   a capacitance-based position sensor, including:
      capacitor circuitry, including a capacitor having a capacitance that varies with relative position of the computer storage medium and access device;
      a source configured to apply a time-varying input to the capacitor, the capacitor circuitry being configured to yield a time-varying, capacitance-dependent output in response to such application of the time-varying input; and
      an integrator configured to integrate, for a predetermined time period, a received signal which is based upon the time-varying, capacitance-dependent output, and thereupon yield an integrator output which is proportional to the value of the capacitance.

20. The computer storage device of claim 19, where the time-varying input is periodic, and where the predetermined time period is a predetermined number of periods of the time-varying input.

21. The computer storage device of claim 19, where the capacitance-based position sensor further comprises a multiplier, and where the time-varying input is a first time-varying input, and where the received signal is generated by using the multiplier to multiply the first time-varying input with a second time-varying input.

22. The computer storage device of claim 21, where the first time-varying input includes a sinusoidal signal.

23. The computer storage device of claim 22, where the second time-varying input includes a sinusoidal signal which is equal in frequency but shifted in phase from the sinusoidal signal of the first time-varying input.

24. The computer storage device of claim 23, where the sinusoidal signals differ in phase by ninety degrees.

25. The computer storage device of claim 19, where the capacitance-based position sensor is configured to sample the integrator output to yield a demodulated position signal.

26. The computer storage device of claim 19, where the integrator is one of a plurality of integrators, each integrator being configured to produce output corresponding to one of a plurality of different relative movements.

* * * * *